(12) United States Patent
Hoffmann et al.

(10) Patent No.: US 7,694,936 B2
(45) Date of Patent: Apr. 13, 2010

(54) METHOD AND DEVICE FOR FUNCTION-MONITORING AN ACTUATOR

(75) Inventors: Heinfried Hoffmann, Frankfurt (DE); Thomas Karte, Bruchköbel (DE); Jörg Kiesbauer, Eppertshausen (DE); Mario Menze, Hattersheim (DE); Ulrich Schulz, Grünstadt (DE)

(73) Assignee: Samson Aktiengesellschaft, Frankfurt (DE)

( * ) Notice: Subject to any disclaimer, the term of this patent is extended or adjusted under 35 U.S.C. 154(b) by 362 days.

(21) Appl. No.: 11/521,337

(22) Filed: Sep. 14, 2006

(65) Prior Publication Data

US 2007/0057216 A1   Mar. 15, 2007

(30) Foreign Application Priority Data

Sep. 15, 2005   (DE) ............... 10 2005 044 126

(51) Int. Cl.
*F16K 31/02*   (2006.01)
(52) U.S. Cl. .................. 251/129.04; 700/282
(58) Field of Classification Search ............ 251/129.04; 137/553, 554, 559; 700/28–30, 78, 56, 90, 700/302, 282; 702/1, 33, 34, 85, 94, 97, 702/105, 108, 113, 114, 127, 182
See application file for complete search history.

(56) References Cited

U.S. PATENT DOCUMENTS

| | | | | |
|---|---|---|---|---|
| 4,029,122 A * | 6/1977 | Jaegtnes | ............ | 137/551 |
| 5,109,692 A * | 5/1992 | Fitzgerald | ............ | 73/168 |
| 5,197,328 A * | 3/1993 | Fitzgerald | ............ | 73/168 |
| 5,406,474 A * | 4/1995 | Hansen | ............ | 700/37 |
| 5,538,036 A * | 7/1996 | Bergamini et al. | ............ | 137/552 |
| 5,604,305 A | 2/1997 | Denz et al. | | |
| 5,687,098 A * | 11/1997 | Grumstrup et al. | ............ | 700/282 |
| 6,026,352 A * | 2/2000 | Burns et al. | ............ | 702/182 |
| 6,155,283 A * | 12/2000 | Hansen et al. | ............ | 137/1 |
| 6,192,321 B1 | 2/2001 | Grumstrup et al. | | |
| 6,267,138 B1 * | 7/2001 | Hoffmann et al. | ............ | 137/551 |
| 6,272,401 B1 * | 8/2001 | Boger et al. | ............ | 700/282 |
| 6,453,261 B2 * | 9/2002 | Boger et al. | ............ | 702/138 |
| 6,466,893 B1 * | 10/2002 | Latwesen et al. | ............ | 702/179 |
| 6,745,084 B2 * | 6/2004 | Boger et al. | ............ | 700/13 |
| 6,999,853 B2 * | 2/2006 | Junk et al. | ............ | 700/282 |
| 7,089,086 B2 * | 8/2006 | Schoonover | ............ | 700/275 |
| 2001/0037670 A1 * | 11/2001 | Boger et al. | ............ | 73/1.72 |
| 2002/0108436 A1 * | 8/2002 | Albuaijan | ............ | 73/168 |
| 2003/0034469 A1 * | 2/2003 | Mack | ............ | 251/129.04 |
| 2005/0043911 A1 | 2/2005 | Hoffmann et al. | | |

(Continued)

FOREIGN PATENT DOCUMENTS

DE   38 07 278 C2   9/1989

(Continued)

*Primary Examiner*—John K Fristoe, Jr.
*Assistant Examiner*—Marina Tietjen
(74) *Attorney, Agent, or Firm*—Schiff Hardin LLP

(57) ABSTRACT

In a method or device for function-monitoring an actuator in a process engineering plant, said actuator comprising a valve and an actuating drive for actuating said valve. A positioner is provided for setting a position of the valve, the positioner comprising a controller module. A predefined activation test signal is generated and applied to the controller module to position the actuator into a predefined function condition. A control signal is generated by the controller module for signalling the actuating drive in accordance with the activation test signal and an output control signal is sensed and monitored as compared to a reference control signal.

23 Claims, 1 Drawing Sheet

U.S. PATENT DOCUMENTS

| | | | |
|---|---|---|---|
| 2006/0219299 A1* | 10/2006 | Snowbarger | 137/487.5 |
| 2006/0220844 A1* | 10/2006 | Flanders | 340/540 |
| 2007/0078529 A1* | 4/2007 | Thiele et al. | 700/29 |

FOREIGN PATENT DOCUMENTS

| | | |
|---|---|---|
| DE | 44 18 010 A1 | 11/1995 |
| DE | 44 19 548 B4 | 12/1995 |
| DE | 103 20 031 A1 | 12/2004 |
| DE | 103 50 610 A1 | 6/2005 |

* cited by examiner

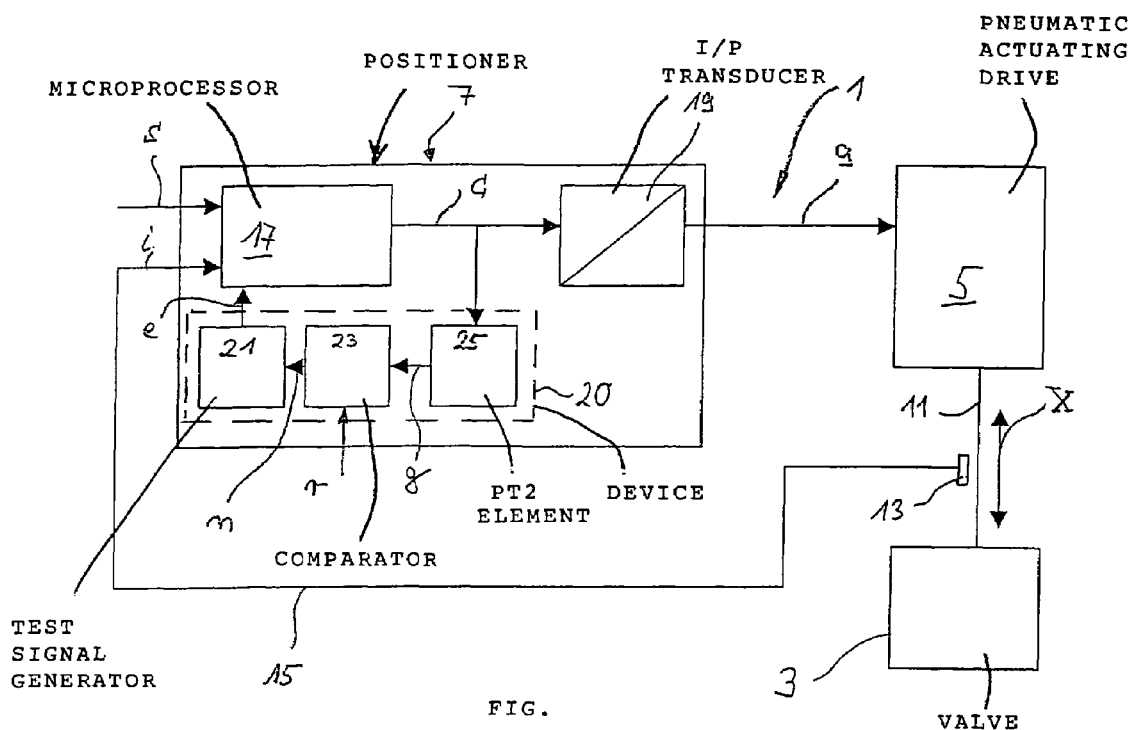
FIG.

METHOD AND DEVICE FOR FUNCTION-MONITORING AN ACTUATOR

BACKGROUND

The preferred embodiment relates to a method and device for function-monitoring an actuator in a process engineering plant, particularly during operation of the plant, the actuator comprising a valve, an actuating drive, such as a pneumatic actuating drive, for actuating the valve and a positioner for setting the position of the valve.

Particularly the operation of a process engineering plant involving toxic fluids poses a risk to man and his environment that needs to be monitored. For this purpose, use is made of actuators including a safety valve which in an emergency situation automatically assumes a safe position. To comply with stringent safety standards, plant operators always need to be sure of correct functioning of the actuators. This is usually done by a test run of the safety valve to a safe position which with most actuators necessitates shutting down at least part of the plant. Thus on-line monitoring, i.e. during its operation, would be desirable. Function-monitoring for this purpose should take into account as many components of the actuator as possible which are susceptible to failure.

One method of function-monitoring an actuator having a proven record of success is described in the German article entitled "Neues integriertes Diagnosekonzept bei digitalen Stellungsreglern" by Dr. Jörg Kiesbauer as published in the magazine "atp-Automatisierungstechnische Praxis", year 46, 2004, No. 4/2004 involving a novel integrated diagnostic concept for function-monitoring digital positioners. In this arrangement, functioning of the actuator is monitored mainly by making use of a displacement sensor which senses an actual value for comparison with a set point value of the position. When the discrepancy between actual and set point position is prohibitive, malfunctioning of the actuator is signalled.

It is known from experience that the internal friction such as sliding friction particularly with closed-loop control valves and sticking with safety control valves in the actuating drive and in the valve is a parameter providing a strong indication as to functioning performance of the actuator. How good the closed-loop control is depends on the existing friction, i.e. the lower and more uniform the friction, the higher the accuracy in attaining closed-loop control.

With safety valves or shutoff valves the forces needed to position the safety valve into its safe position are usually produced by a preloaded spring or by a source of pneumatic energy. If the safety valve has not been operated for a long time, the valve element is subject to high sticking forces, with the risk of the valve element failing to attain the safe position in an emergency situation, because the sticking forces exceed the driving forces as made available or because the actuator upon overcoming the sticking is caused to over-shoot. The problems involved in known methods of function-monitoring may result in safe operation of the plant being seriously diminished.

Even with closed-loop control valves, which are often positioned, the problem of sticking or uneven friction may occur, making it essential to sense the true displacement of the closed-loop control valve. Once the monitoring procedure has been started, sticking or slipping of the valve element cannot be sensed until the resistance has been overcome and the high drive forces needed for this purpose act on the valve element which inevitably results in an undesirable overshoot of the valve, termed stick/slip.

SUMMARY

An object is to overcome these disadvantages in the prior art, particularly in providing a method and a device for function-monitoring an actuator for a process engineering plant which now makes it possible to reliably monitor functioning of the actuator by sensing unwanted operating conditions such as the stick/slip of the actuator without disrupting plant operation or having to shut down the plant.

In a method or device for function-monitoring an actuator and a processing engineering plant, the actuator comprising a valve, an actuating drive for actuating the valve, and a positioner for setting a position of the valve, the positioner comprising a controller module, a predefined activation test signal is generated and applied to the controller module to position the actuator into a predefined function condition. By said controller module, a control signal is generated for signalling the actuating drive in accordance with the activation test signal. The output control signal is directly sensed and is monitored compared to a reference control signal.

BRIEF DESCRIPTION OF THE DRAWING

The drawing FIGURE shows a block diagram for function-monitoring an actuator.

DESCRIPTION OF A PREFERRED EMBODIMENT

For the purposes of promoting an understanding of the principles of the invention, reference will now be made to a preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

During operation of the plant, i.e. without disrupting plant operation, a predefined activation test signal is generated by a test signal generator and applied to a controller module of a positioner. The controller module is preferably an electronic component for either digital functioning by a microprocessor or analog functioning by a transistor array. The activation test signal is generated so that the actuator is signalled into a predefined function condition in the course of the test. On the basis of its processing and/or closed-loop control procedure as usual in operation, the controller module produces in accordance with the activation test signal an output control signal for activating the actuator. In accordance with the preferred embodiment this output control signal of the controller module is sensed and compared to a reference control signal corresponding to correct functioning of the actuator, particularly as obtained from experience as indicative of correct functioning. Although it is understood that the control signal can be directly sensed at the output of the controller module, it may also be sensed at components of the positioner not involved in the controller module, sensing being preferred, however, before the control signal gains access to the actuating drive.

Integrating internal monitoring the positioner restricted to the input electrical control signal for comparison with a designed reference control signal in accordance with the preferred embodiment now makes it possible to detect malfunctioning of the actuator directly without delay, because the time delay due to an external linear sensing arrangement and signal corruption due to noise as hitherto inevitable is now avoided.

Should it happen, for example, in the course of monitoring in accordance with the preferred embodiment that control signals are output by the positioner or controller module requiring an excessively high force by the actuating drive for positioning the valve this is an indication of stick/slip in the valve or actuating drive. In the method and device in accordance with the preferred embodiment monitoring can now be aborted to prevent overshoot of the final control element when the valve is defective, resulting in components of the actuator needing to be serviced or even replaced new.

After abortion of monitoring or termination in general of a positive result of monitoring, a diagnostic routine can be output.

The basis for evaluating whether the control signal, output and sensed by the controller module of the positioner, is within permissible limits, in defining the designed reference control signal, is a test run, particularly also a test run online, carried out on the correctly functioning actuator. The sensed control signals of the positioner are then stored in the test signal generator. For actuators of the same type values gained from experience can be employed to determine the reference control signal without having to carry out a separate test run for storing the reference control signals.

Preferably the activation test signal is designed such that the valve—for a correctly functioning actuator—is positioned only partly. This displacement should be set so that it does not disturb plant operation or at least only to a negligible degree.

For example, a safety valve the activation test signal is to be dimensioned so that the safety valve is positioned from a passive position for the monitoring procedure up to 10% of the full displacement for attaining the safe position. By contrast, the activation test signal for a closed-loop control valve is to be dimensioned so that the positioning movement for the monitoring procedure is only 2%, preferably 1%, and preferably 0.5%, of the displacement required in all for closed-loop control. With safety valves too, a small movement of, for example, 0.5% in selected ranges may be an all too general means of diagnosis. Setting these positioning movements ensures that plant operation is not disrupted by the monitoring procedure.

One particular advantage afforded by the method in accordance with the preferred embodiment can be appreciated in that for the activation test signal and the control signal only electrical variables are employed which signal an I/P transducer. Changes in pressure or displacement sensed externally do not need to be taken into account as a mandatory requirement for the method in accordance with the preferred embodiment, this being one reason why the method is so flexible to advantage.

In one preferred further embodiment of the invention the activation test signal is a change in time of the positioner input signal. In this arrangement the activation test signal can be defined as a step function or as a ramp signal with a large time constant.

It is particularly with positioners including a displacement sensor that the method and device in accordance with the preferred embodiment can be designed so that they work without a position set point value of the actuating drive or of the valve, there also being no need to use an actual value of the position in the method in accordance with the preferred embodiment.

The method in accordance with the preferred embodiment now makes it possible to directly sense the internal friction, particularly the stick/slip of the valve and/or of the actuating drive with the aid of the ratio of the change in the control signal involved in the course of the monitoring procedure (particularly with a pneumatic actuating drive the change of a control pressure generated by a current/pressure transducer from the control signal) to the change in the sensed actual values of the position of the valve or actuating drive.

The device in accordance with the preferred embodiment for function-monitoring comprises in addition to the test signal generator connected to the positioner for generating the activation test signal, a comparator which senses the control signal output by the positioner and monitors it by comparison with the designed reference control signal.

A routine for aborting monitoring can be integrated in the test signal generator.

Preferably the device comprises a structure for producing a diagnostic protocol which can be integrated in the comparator.

In another further embodiment of the invention a filter, particularly a pT2 element, is included at the input to the comparator and which receives the control signal of the positioner.

It is understood that the device in accordance with the preferred embodiment is designed to monitor functioning of the actuator by the method in accordance with the preferred embodiment.

Further advantages, aspects and features of the preferred embodiment will now be detailed in the following description of a preferred embodiment with reference to the drawing. The FIGURE shows a block diagram of an actuator in accordance with the preferred embodiment incorporating a device in accordance with the preferred embodiment for function-monitoring the actuator.

The FIGURE shows an actuator 1 with three main components: a valve 3, a pneumatic actuating drive 5 mechanically coupled to the valve 3, and a positioner 7.

The pneumatic actuating drive 5 receives via the positioner 7 a control pressure 9 prompting the pneumatic actuating drive 5 to set the valve 3 up and down along a displacement indicated by a double arrow X. Disposed between the pneumatic actuating drive 5 and the valve 3 is a sensor 13 for sensing the actual position of the valve 3 and which may be arranged spatially within or without the positioner 7.

The sensor 13 is connected by a conductor 15 to a controller module 17 of the positioner 7 configured as a microprocessor. The microprocessor 17 receives a position actual signal i sensed by the sensor 13 and compares it to a position set point value s stored in a memory (not shown). By comparing position actual signal i and position set point value s the microprocessor 17 computes by its closed-loop control computing routine a control signal c which is applied to an I/P transducer 19 which on the basis of the control signal defines the control pressure signal 9 for the pneumatic actuating drive 5.

The device 20 in accordance with the preferred embodiment for function-monitoring the actuator 1 comprises in accordance with the embodiment as shown in the FIGURE three main components: a test signal generator 21, a comparator 23 and an optional signal processor with a filter or pT2 element 25. In routine, particularly automatic, initiation of function-monitoring by means of the device 20 an activation test signal e is generated in the test signal generator 21 which is applied to the microprocessor 17 of the positioner 7 via a separate input. It is understood that the device 20 as shown in the FIGURE may also be arranged external to the housing of the positioner.

The activation test signal e is configured as the change in time of a positioner input. The activation test signal e is processed in the microprocessor 17 without taking into account the position set point value s on the basis of the closed-loop control computing routine by a corresponding control signal c being generated furnished at the output of the microprocessor 17 to both the I/P transducer and also to the pT2 element 25. To quantitatively detect the friction the position actual signals i and comparison thereof with the electrical control signal or control pressure 9 (see list of reference numerals) can be employed.

The pT2 element 25 furnishes a filtered signal g to the comparator 23 which may be configured as a simple alarm unit. In this case the comparator 23 compares the filtered control signal g to a reference control signal r. On violation of a maximum permissible departure of the filtered control signal g from the reference control signal r the comparator 23 outputs an emergency signal n to the test signal generator 21 which triggers an abort routine to instantly cease the method for online function-monitoring the actuator 1. The test signal generator 21 can be designed to apply an abort signal to the microprocessor 17.

If the actuator of the valve has seized, so that the drive force of the pneumatic actuating drive 5 is no longer sufficient to position it to the safe position, the comparator 23 would "see" a control signal c which is way above the reference control signal r needed to attain the safe position.

If the control signal c remains within the tolerable limits with respect to the reference control signal r the comparator can be designed to output a positive diagnostic protocol (not shown).

The reference control signal r can be detected and made available by putting the actuator through a test run in making sure that functioning of the actuator is assured. The control signal c as sensed thereby, when filtered by the pT2 element, can be saved as the reference variable r in a memory (not shown).

Also when operating a closed-loop control valve which is often positioned, the activation test signal e is designed so that the microprocessor 17 generates a control signal c which signals the closed-loop control valve to 0.5% of its full displacement. Should excessive stick/slip forces materialize this is likewise detected by the device 20 in accordance with the preferred embodiment in particularly preventing overshoot of the closed-loop control valve.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for function-monitoring an actuator in a process engineering plant, said actuator comprising a valve and a pneumatic actuating drive for actuating said valve, and a positioner for setting a position of said valve, said positioner comprising a microprocessor, comprising the steps of:
   generating a predefined electrical activation test signal and applying it to said microprocessor to position said actuator into a predefined function condition;
   generating by said microprocessor an electrical output control signal for signalling an I/P transducer for said actuating drive in accordance with said electrical activation test signal; and
   directly sensing said electrical output control signal and monitoring it compared to a reference control signal which is independent of actual position of said actuating drive and valve;
   wherein said reference control signal is saved in a scope of operation initiated by said electrical activation test signal when said actuator correctly functions or is entered manually into a memory based on values gained from experience.

2. A method of claim 1 wherein monitoring is aborted if a prohibitive deviation between said electrical output control signal and said reference control signal is sensed.

3. A method of claim 1 wherein upon at least one of termination and abortion of monitoring a diagnostic protocol is output.

4. A method of claim 1 wherein a partial displacement of said valve is prompted by said electrical activation test signal.

5. A method of claim 1 wherein said electrical activation test signal prompts a positioning movement of said valve, so that said positioning movement does not disturb plant operation or at least only to a negligible degree.

6. A method of claim 1 wherein said valve comprises a safety valve and said valve is prompted by said electrical activation test signal from a passive position up to 10% of a displacement needed to fully attain a safe position.

7. A method of claim 1 wherein said valve comprises a closed loop control valve and a positioning movement by said closed-loop control valve is prompted by said electrical activation test signal up to 2% of a displacement required as a whole for closed-loop control.

8. A method of claim 1 wherein said electrical activation test signal represents a change in time of an input signal for a closed-loop control of positioning.

9. A method of claim 1 wherein said electrical activation test signal is designed as a step function.

10. A method of claim 1 wherein said electrical activation test signal is designed as a ramp signal with a large time constant.

11. A method of claim 1 wherein a position movement of said actuator is monitored without taking into account a position set point value of said actuating drive or of said valve.

12. A method of claim 1 wherein an actual value of a position of said valve is not used.

13. A method of claim 1 wherein an internal friction is sensed of said valve or of said actuating drive with aid of a ratio of a change in said electrical output control signal involved in a course of monitoring to a change in a sensed displacement of said valve or of said actuating drive.

14. A method of claim 1 for function-monitoring said actuator in said process engineering plant during operation of the plant and wherein said valve comprises a safety control valve which in an emergency situation is automatically displaced to a safe position.

15. A device for function-monitoring of a pneumatic actuator in a process engineering plant, said actuator comprising a valve, an actuating drive for actuating said valve, and a positioner for setting a displacement of said valve, said positioner comprising a microprocessor, comprising:
   a test signal generator connected to said microprocessor for generating an electrical activation test signal intended to position said actuator into a predefined function condition and applicable to said microprocessor so that said microprocessor outputs an electrical control signal for signalling an I/P transducer for said actuating drive in accordance with said electrical activation test signal; and
   a comparator which senses said electrical output control signal and monitors it by comparison with a reference control signal which is independent of actual position of said actuating drive and valve;

wherein said reference control signal is saved in a scope of operation initiated by said electrical activation test signal when said actuator correctly functions or is entered manually into a memory based on values gained from experience.

16. A device of claim 15 which can be deactivated for aborting function monitoring when a prohibitive departure between said electrical output control signal and said reference control signal is sensed.

17. A device of claim 16 wherein said function monitoring aborting is integrated in said test signal generator.

18. A device of claim 15 which is designed to produce a diagnostic protocol.

19. A device of claim 15 wherein a filter which receives the electrical output control signal of said positioner is included in an input to said comparator.

20. A device of claim 15 which works without a system for sensing an actual position of said valve.

21. A device of claim 15 wherein said device for function-monitoring said actuator in said process engineering plant occurs during operation of said plant, and said valve comprises a safety control valve which in an emergency situation is automatically displaced to a safe position.

22. A method for function-monitoring a pneumatic actuator in a process engineering plant, said actuator comprising a valve and a pneumatic actuating drive for actuating said valve, comprising the steps of:

providing a positioner for setting a position of said valve, said positioner comprising a microprocessor;

generating a predefined electrical activation test signal with a test signal generator and applying it to said microprocessor to position said actuator via said microprocessor into a predefined function condition;

generating by said microprocessor an electrical output control signal for signalling an I/P transducer for said actuating drive in accordance with said activation test signal;

sensing said electrical output control signal and monitoring it compared to a reference control signal which is independent of actual position of said actuating drive and valve with a comparator; and outputting a signal from said microprocessor to said test signal generator to trigger an abort routine;

wherein said reference control signal is saved in a scope of operation initiated by said electrical activation test signal when said actuator correctly functions or is entered manually into a memory based on values gained from experience.

23. A method of claim 22 for function-monitoring said actuator in said process engineering plant during operation of the plant and wherein said valve comprises a safety control valve which in an emergency situation is automatically displaced to a safe position.

* * * * *